US008655507B2

(12) United States Patent
Coulmeau et al.

(10) Patent No.: US 8,655,507 B2
(45) Date of Patent: Feb. 18, 2014

(54) METHOD AND SYSTEM FOR DYNAMICALLY MANAGING A FLIGHT PROCEDURE OF AN AIRCRAFT FLIGHT PLAN

(75) Inventors: François Coulmeau, Seilh (FR); Christophe Caillaud, Blagnac (FR); Thierry Person, Toulouse (FR)

(73) Assignee: Thales, Neuilly sur Seine (FR)

( * ) Notice: Subject to any disclaimer, the term of this patent is extended or adjusted under 35 U.S.C. 154(b) by 420 days.

(21) Appl. No.: 12/968,321

(22) Filed: Dec. 15, 2010

(65) Prior Publication Data

US 2011/0313598 A1 Dec. 22, 2011

(30) Foreign Application Priority Data

Dec. 18, 2009 (FR) ...................................... 09 06179

(51) Int. Cl.
*G05D 1/00* (2006.01)
*G01C 23/00* (2006.01)

(52) U.S. Cl.
USPC .................. 701/3; 701/16; 701/120; 340/945

(58) Field of Classification Search
USPC ................... 701/3, 10, 16, 18, 120, 528, 467; 340/945, 961, 973; 244/137.1
See application file for complete search history.

(56) References Cited

U.S. PATENT DOCUMENTS

| | | | | | |
|---|---|---|---|---|---|
| 5,797,106 | A * | 8/1998 | Murray et al. | .................. | 701/11 |
| 6,134,500 | A * | 10/2000 | Tang et al. | .................... | 701/528 |
| 6,389,355 | B1 * | 5/2002 | Gibbs et al. | ................... | 701/467 |
| 6,922,631 | B1 * | 7/2005 | Dwyer et al. | ................. | 701/528 |
| 7,433,779 | B2 * | 10/2008 | Deker et al. | ................. | 701/122 |
| 8,086,362 | B2 * | 12/2011 | Dupre et al. | ..................... | 701/14 |
| 8,165,734 | B2 * | 4/2012 | Wachenheim et al. | ........... | 701/7 |
| 2005/0261808 | A1 * | 11/2005 | Artini et al. | ....................... | 701/3 |
| 2008/0004757 | A1 | 1/2008 | Ingram et al. | | |
| 2009/0125222 | A1 * | 5/2009 | McCullough et al. | ........ | 701/120 |
| 2010/0030401 | A1 * | 2/2010 | Rogers et al. | ..................... | 701/3 |

FOREIGN PATENT DOCUMENTS

| | | |
|---|---|---|
| EP | 0798685 | 10/1997 |
| FR | 2861871 | 5/2005 |
| FR | 2910124 | 6/2008 |
| FR | 2910679 | 6/2008 |
| FR | 2926156 | 7/2009 |

* cited by examiner

*Primary Examiner* — Tan Q Nguyen
(74) *Attorney, Agent, or Firm* — Baker & Hostetler LLP

(57) ABSTRACT

A method of managing a flight procedure of an aircraft flight plan, which has at least one segment, includes a step in which an additional attribute of the segment representative of a compulsory or optional nature of the flight of said segment is dynamically selected.

10 Claims, 1 Drawing Sheet

METHOD AND SYSTEM FOR DYNAMICALLY MANAGING A FLIGHT PROCEDURE OF AN AIRCRAFT FLIGHT PLAN

CROSS-REFERENCE TO RELATED APPLICATION

This application claims priority to foreign French patent application No. FR 09 06179, filed on Dec. 18, 2009, the disclosure of which is incorporated by reference in its entirety

FIELD OF THE INVENTION

The invention pertains to a method of and a system for dynamically managing a flight procedure of an aircraft flight plan.

BACKGROUND OF THE INVENTION

With air traffic increasing non-stop since its beginnings, the workload of and the number of tasks to be performed by air traffic controllers are increasing accordingly.

It is necessary to improve the flight procedures of aircraft flight plans, so as to best manage the available airspace, as well as the available equipment, such as landing runways.

This increase in air traffic compels, for example, increased frequencies of landing on landing runways. This entails notably the instigation of time constraints and maximum reduction in the time interval separating two successive landings on a runway, while maintaining a safety separation distance between the aircraft in the final approach so as to reduce the risks of collision or stalling related to wake turbulence or to unforeseen maneuvers such as go-arounds.

A flight plan is the detailed description of the route to be followed by an aircraft within the framework of a scheduled flight. It comprises notably a chronological sequence of waypoints described by their position, their altitude and their time of overflight. The waypoints constitute the reference trajectory to be followed by the aircraft with a view to best complying with its flight plan. This trajectory is a valuable aid both to the ground control personnel and to the pilot, for anticipating the movements of the aircraft, for example an airplane, and thus ensuring an optimum safety level, notably within the framework of the maintaining of inter-aircraft separation criteria. The flight plan is commonly managed aboard civilian airplanes by a flight management system designated by the terminology "Flight Management System", that will be called FMS subsequently, which places the reference trajectory at the disposal of the flight personnel and at the disposal of the other onboard systems. Essentially with a view to safety, it is therefore necessary to ensure that the aircraft follows at least in geographical terms the reference trajectory described in the flight plan, so as notably to maintain separation distances between aircraft.

With this aim, State bodies and airport authorities have for example for a very long time been obliged to publish takeoff and landing procedures. These procedures were for a long time published solely in paper form, according to graphical and textual formalisms. They guarantee the safety of flights on departure or on arrival at aerodromes. But with the advent in avionics of flight management systems such as FMSs and navigation and landing units known by the terminology of "Global Navigation and Landing Unit" or GNLU, procedures published in paper form have become unsuitable, or indeed totally outmoded. The need has appeared to manage in a digital format all the procedures published by State bodies.

At present, the published procedures are supplied to various suppliers of navigation databases by specialized bodies of the States belonging to the International Civil Aviation Organization or ICAO. The textual and graphical formalisms used are defined by the ICAO, but sometimes they are poorly complied with by State bodies. The suppliers transform the textual descriptions into series of "legs" according to the terminology employed in the realm of aeronautics. A "leg" corresponds to a trajectory portion defined by several parameters, such as for example directives to be followed in terms of position, altitude, heading or route. Hereinafter in the present application, the terminology of "legs" will be replaced by the terminology of "trajectory portions" or "segments", it being understood that this substitution is of interest only for translation purposes and that an English version of the present application ought preferably to preserve the original term of "leg". In any event, the term "segment" must not here be considered as limited to straight line segments, it can also designate curvilinear segments or combinations of straight line segments and curvilinear segments. The ARINC 424 standard defines a segment or "leg" by parameters representing a point and the manner of arriving there.

The series of "legs" or of "segments" are supplied in a digital format, the suppliers being relatively free in their interpretation of the procedures published as series of segments. The databases thus produced by the suppliers are called navigation databases.

FIG. 1 illustrates an architecture of a flight management system. It is recalled that an aircraft is equipped with a flight management system, or FMS, which exchanges diverse information with the ground and with other equipment of the aircraft. It communicates with the crew by way of man-machine interfaces or MMIs, such as screens and keyboards. The navigation aid system assists the crew in the programming of the flight plan before takeoff up to landing. Its assistance in the programming of the flight plan consists on the one hand in plotting in the horizontal and vertical planes a trajectory skeleton formed of a succession of waypoints or WPs, associated with various directives regarding altitude, speed, heading etc., and on the other hand in calculating, also in the horizontal and vertical planes, the trajectory that the aircraft will have to follow in order to fulfill its mission.

When preparing for flight plan programming, the crew enter into the flight management system FMS, in an implicit or explicit manner, the geographical coordinates of the waypoints and the flight directives which are associated therewith, and obtain a trajectory skeleton, a flight trajectory and a flight plan from the flight management system FMS. The trajectory is constructed by chaining together segments linking the waypoints WP pairwise from the departure point to the destination point, at one and the same time to ensure the transitions of heading between segments at the level of the waypoints WP and to follow certain curved segments. The trajectory skeleton and the trajectory are displayed on a navigation screen so as to enable the crew to verify their relevance. The flight plan comprises the horizontal and vertical trajectories supplemented with the flight directives or clearances. The vertical trajectory is generally designated vertical profile.

Before takeoff, the flight plan aboard the aircraft and that of the air traffic control authority or ATC are identical.

During the flight, unforeseen events arise which will modify the flight plan. These involve for example changes of weather, of traffic, or indeed faults aboard the aircraft. These events are communicated to the ATC air traffic control authority when the latter is unaware thereof. The ATC can then transmit new flight directives taking these events into account and of which the crew are made aware by way of the man-machine interfaces MMI.

The onboard flight management system (FMS) determines the geometry of the 4D profile (3D+time-profile of speeds), and dispatches the guidance directives for following this profile to the pilot or to the automatic pilot AP. The following functions described in the ARINC 702 standard (Advanced Flight Management Computer System, December 1996) are at the disposal of a flight management system. Such a flight management system FMS comprises:

- a navigation module LOCNAV, for performing optimal location of the aircraft as a function of the geo location means GL (GPS, GALILEO, VHF radio beacons, inertial platforms);
- a flight plan module FPLN, for inputting the geographical elements constituting the skeleton of the route to be followed (departure and arrival procedures, waypoints WP);
- a navigation database NAV_DB, for formulating geographical routes and procedures with the help of data included in the bases (points, beacons, segments, etc.);
- a performance database, PERF_DB, containing the aircraft's aerodynamic and engine parameters;
- a lateral trajectory module TRAJ, for formulating a continuous trajectory on the basis of the points of the flight plan, complying with the performance of the aircraft and the confinement constraints;
- a prediction module PRED, for formulating an optimized vertical profile on the lateral trajectory;
- a guidance module, GUID, for guiding in the lateral and vertical planes the aircraft on its 3D trajectory, while optimizing its speed;
- a situation perception module SA, for "situation awareness", notably for communicating with the ATC control centers and the other aircraft.

At present, when the pilot modifies the trajectory of the aircraft, i.e. if the aircraft no longer follows its flight plan, the latter is not reupdated automatically. The onboard systems of aircraft, such as the flight management system FMS, make the assumption that the airplane returns to its trajectory according to a rejoining mode defined by the constructors of flight management systems FMS.

These systems make their predictions (altitude, time, speed, fuel consumed, etc.) over the whole set of points of the flight plan. These systems do not know how to filter a part of the flight plan in order to shorten it and to make predictions over a subset of elements of the initial flight plan.

SUMMARY OF THE INVENTION

The invention alleviates at least the abovementioned problems.

According to one aspect of the invention, there is proposed a method of dynamically managing a flight procedure of an aircraft flight plan, said flight procedure comprising at least one segment, the method comprising a step in which an additional attribute of the segment representative of a compulsory or optional nature of the flight of said segment is selected dynamically.

Thus, it is possible to dynamically filter a part of the flight plan so as to shorten it and make predictions on a subset of elements of the initial flight plan.

The segment, or "leg", is defined by the ARINC 424 standard, and by said additional attribute.

In one embodiment the additional attribute representative of a compulsory or optional nature of the flight of a segment is coded digitally into a database of the flight management system of the aircraft.

Thus, the crew is spared from manual input on this element of the optional/compulsory nature of the procedure, and omissions or errors of input are alleviated.

According to one embodiment, the additional attribute representative of a compulsory or optional nature of the flight of a segment is modifiable by way of at least one man-machine interface.

Thus, the crew is enabled to overlay a possible automatic definition of the optional/compulsory nature of the procedure. Moreover, this avoids a modification of the Arinc 424 international standard for coding the "legs" which would require the updating of numerous fleets of airplanes equipped with a flight management system FMS.

In one embodiment, in which said flight procedure comprises a circular arc centered on a convergence point, at least one first initially compulsory segment and at least one second initially optional segment.

The invention applies particularly to a concept of approach in a circular arc about a convergence point or "merge point" close to the landing runway. The ATC control center places the aircraft on a circular arc centered about the convergence point after which the aircraft will follow one another up to the landing runway. The aircraft will turn on this circular arc until the latter is directed toward the convergence point so as to comply with a temporal directive regarding spacing between two successive aircraft at the convergence point, for example of 90 seconds, or to comply with a time constraint on a point or a spacing directive regarding the distance between two successive aircraft, for example of 5 NM (nautical miles).

According to one embodiment, the method comprises a step of automatically determining a possible change of value of said additional attribute of said second segment representative of a compulsory or optional nature of the flight of said second segment.

Thus, anticipations may be performed automatically, and may limit the work of the air traffic control centers.

In one embodiment, the method comprises a step of semi-automatically determining, with manual validation, a possible change of value of said additional attribute of said second segment representative of a compulsory or optional nature of the flight of said second segment.

Thus, this step must be accepted by the pilot or a member of the crew.

According to one embodiment, the method comprises a step of manually determining a possible change of additional attribute value of said second segment representative of a compulsory or optional nature of the flight of said second segment.

Thus, in a dynamic manner, it is possible for the pilot of the aircraft or for a crew member to dynamically modify a flight procedure of a flight plan.

According to another embodiment, there is also proposed a system for dynamically managing a flight procedure of an aircraft flight plan, said flight procedure comprising at least one segment. The system comprises means for dynamically selecting an attribute of the segment representative of a compulsory or optional nature of the flight of said segment.

In one embodiment, a segment is defined by the ARINC 424 standard, and by said additional attribute.

BRIEF DESCRIPTION OF THE DRAWINGS

The invention will be better understood on studying a few embodiments described by way of wholly non-limiting examples and illustrated by the appended drawings, in which.

DETAILED DESCRIPTION

Figure 1:
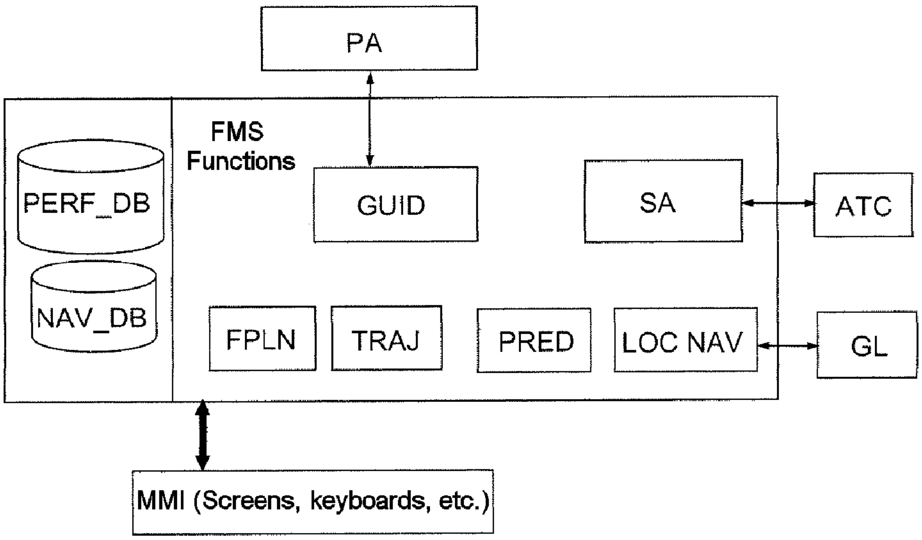
FIG. 1 schematically illustrates a flight management system.

In the various figures, the same or like elements have the same reference characters.

Figure 2:
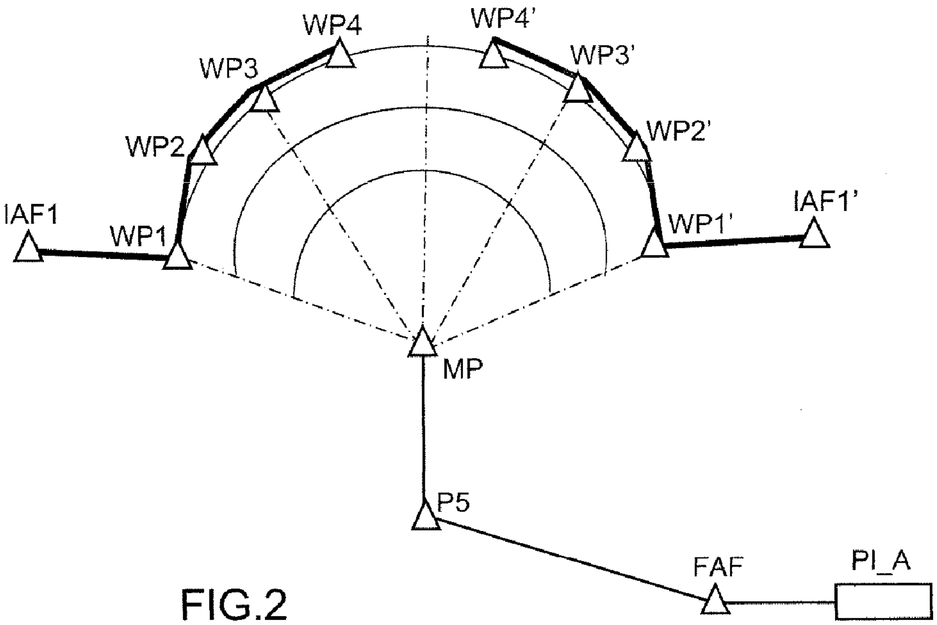
FIG. 2 schematically illustrates an approach procedure involving a circular arc centered on a convergence point.

In FIG. 2 is represented a flight procedure corresponding to an approach involving a circular arc centered on a convergence point MP, commonly called a "Merge Point" procedure. In the subsequent description, the invention is described with respect to this flight procedure, by way of nonlimiting example, it being possible for the invention to be applied to any flight procedure.

The example described comprises two circular arc trajectories to take account of aircraft arriving from the two possible sides, but is applied by analogy with a "merge point" procedure to a single circular arc trajectory.

Each of these two trajectories comprises a respective entry point IAF1 and IAF1'. Each of these trajectories thereafter comprises four respective consecutive points WP1, WP2, WP3, WP4 and WP1', WP2', WP3', WP4' disposed on a circular trajectory centered on a common convergence point MP.

In the procedure, the two first segments or "legs", respectively defined by the waypoints IAF1, WP1, WP2, and IAF1', WP1', WP2', of each circular trajectory must be flown.

The following two second segments, respectively defined by the waypoints WP2, WP3, WP4, and WP2', WP3', WP4', of each circular trajectory serve as buffer, making it possible for the circular trajectory flight time to be lengthened slightly, before the aircraft steers toward the convergence point MP, for example to comply with a compulsory gap between two successive aircraft on the landing runway PI_A, for example of 90 seconds, of a time constraint, or a communication fault between the control center ATC and the aircraft.

These two second respective segments [WP2-WP3], [WP3-WP4] and [WP2'-WP3'], [WP3'-WP4'] are therefore not necessarily flown, and the invention makes it possible to take account thereof dynamically, by dynamically managing an additional attribute ATB of a second segment, representative of a compulsory or optional nature of the flight of said second segment.

Thus, it is possible in a flight procedure to take account solely of a subset of waypoints or of a subset of segments of the procedure so as to make predictions over a subset of the flight plan without needing to modify it.

The segments are, for example, defined by the ARINC 424 standard, and by the additional attribute ATB.

This attribute may be coded digitally in a database of the flight management system FMS of the aircraft. These data are managed by the navigation database NAV_DB of the architecture of the flight management system FMS and placed at the disposal of the flight plan module FPLN.

The method can comprise a step of automatically determining a possible change of value of said additional attribute of said second segments representative of a compulsory or optional nature of the flight of said second segments. Indeed, in a Merge Point procedure, the two second segments of a circular trajectory are initially considered as not flown, but the invention makes it possible to be able to dynamically modify the attribute ATB so as to consider them as having to be flown.

The FMS can then in an automatic manner, for example on receiving flight clearances transmitted by the ATC air traffic control center, dynamically modify the distance traveled by the aircraft on the circular trajectory portion of the flight procedure of Merge Point type. This is performed by the flight plan module FPLN and by the lateral trajectory module TRAJ. The flight plan module FPLN chains the elements of the procedure and places them at the disposal of the lateral trajectory module TRAJ which calculates the corresponding continuous circular arc trajectory, which is displayed to the crew by way of the man-machine interfaces MMI.

Furthermore, the method can comprise, as a variant or in combination, a step of semi-automatically determining, with manual validation, by way of the man-machine interfaces MMI, a possible change of value of said additional attribute of said second segments representative of a compulsory or optional nature of the flight of said second segments. In this case, an automatically proposed modification must be validated by the pilot or a crew member of the aircraft, thereby rendering this step semi-automatic. This modification is handled by the flight plan module FPLN.

The method can also comprise, as a variant or in combination, a step of manually determining a possible change of value of said additional attribute of said second segments representative of a compulsory or optional nature of the flight of said second segments. In this case, it is the pilot or a crew member who can direct operations.

After having reached the convergence point MP, the aircraft steers toward the waypoints P5 and FAF so as to align itself with the direction of the landing runway PI_A. This is performed by the guidance module GUID by feedback slaving to the circular arc trajectory delivered by the lateral trajectory module TRAJ.

Such a method according to the invention may be implemented in a dynamic flight management system FMS.

The invention claimed is:

1. A method of dynamically managing a flight procedure of an aircraft flight plan, said flight procedure comprising at least one segment, said method comprising a step in which an additional attribute of the at least one segment representative of a compulsory or optional nature of the flight of said segment is selected dynamically, wherein said flight procedure comprises a circular arc centered on a convergence point, at least one first initially compulsory segment and at least one second initially optional segment.

2. The method as claimed in claim 1, wherein a segment is defined by the ARINC 424 standard, and by said additional attribute.

3. The method as claimed in claim 1, wherein the additional attribute representative of a compulsory or optional nature of the flight of a segment is coded digitally into a database of the flight management system of the aircraft.

4. The method as claimed in claim 1, wherein the additional attribute representative of a compulsory or optional nature of the flight of a segment is modifiable by way of at least one man-machine interface.

5. The method as claimed in claim 1, further comprising a step of automatically determining a possible change of value of said additional attribute of said second segment representative of a compulsory or optional nature of the flight of said second segment.

6. The method as claimed in claim 1, further comprising a step of semi-automatically determining, with manual validation, a possible change of value of said additional attribute of said second segment representative of a compulsory or optional nature of the flight of said second segment.

7. The method as claimed in claim 1, further comprising a step of manually determining a possible change of value of said additional attribute of said second segment representative of a compulsory or optional nature of the flight of said second segment.

8. A system for dynamically managing a flight procedure of an aircraft flight plan, said flight procedure comprising at least one segment, said system comprising means for dynamically selecting an attribute of the segment representative of a compulsory or optional nature of the flight of said segment, wherein said flight procedure comprises a circular arc centered on a convergence point, and at least one first initially compulsory segment and at least one second initially optional segment.

9. The system as claimed in claim 8, wherein a segment is defined by the ARINC 424 standard, and by said additional attribute.

10. A method of dynamically managing a flight procedure of an aircraft flight plan with a flight management system, said flight procedure comprising at least one segment, said method comprising a step in which an additional attribute of the at least one segment representative of a compulsory or optional nature of the flight of said segment is selected dynamically by the flight management system, wherein said flight procedure comprises a circular arc centered on a convergence point, and at least one first initially compulsory segment and at least one second initially optional segment.

* * * * *